United States Patent [19]

Honda et al.

[11] Patent Number: 5,408,003
[45] Date of Patent: Apr. 18, 1995

[54] STYRENE RESIN COMPOSITION AND METHOD OF PRODUCING MOLDING THEREOF

[75] Inventors: Satoshi Honda; Kazuhiro Yokoo; Hideaki Matsuura, all of Ehime, Japan

[73] Assignee: Sumitomo Chemical Company, Limited, Osaka, Japan

[21] Appl. No.: 54,978

[22] Filed: Apr. 30, 1993

[30] Foreign Application Priority Data

Apr. 30, 1992 [JP] Japan .................................. 4-111269
Apr. 30, 1992 [JP] Japan .................................. 4-111270

[51] Int. Cl.$^6$ ...................... C08L 33/06; C08L 35/06; C08L 25/06; C08L 25/14
[52] U.S. Cl. .................................. 525/227; 525/226; 525/228; 525/240; 525/241; 525/305; 525/308; 525/309
[58] Field of Search ............... 525/227, 230, 241, 242, 525/308, 305, 309, 310, 226, 228

[56] References Cited

U.S. PATENT DOCUMENTS

| | | | |
|---|---|---|---|
| 3,309,424 | 3/1967 | Abe et al. | 525/309 |
| 3,944,631 | 3/1976 | Yu et al. | 525/309 |
| 4,108,923 | 8/1978 | Mast et al. | 525/310 |
| 4,228,269 | 10/1980 | Loshaek et al. | 526/346 |
| 4,263,420 | 4/1981 | Bracke | 525/305 |
| 4,312,725 | 1/1982 | Loshaek et al. | 204/159.22 |
| 4,598,123 | 7/1986 | Cutter | 525/309 |
| 4,849,480 | 7/1989 | Antonelli et al. | 525/305 |

FOREIGN PATENT DOCUMENTS

| | | | |
|---|---|---|---|
| 2431511 | 2/1980 | France . | |
| 56-167706 | 12/1981 | Japan | C08F 12/00 |
| 61-223701 | 10/1986 | Japan | G02B 1/04 |
| 62-187712 | 8/1987 | Japan | C08F 12/08 |

OTHER PUBLICATIONS

Encyclopedia of Polymer Science and Engineering, vol. 16, p. 26, John Wiley & Sons.
JP-A-56-167706 Abstract.
JP-A-61-223701 Abstract.
JP-A-62-187712 Abstract.

Primary Examiner—Peter A. Szekely
Attorney, Agent, or Firm—Sughrue, Mion, Zinn, Macpeak & Seas

[57] ABSTRACT

A styrene resin composition comprising a crosslinked styrene resin and uniformly dispersed therein an uncrosslinked resin capable of being extracted with an organic solvent, the amount of the uncrosslinked resin being from 3 to 50% by weight based on the total amount of the composition; and a method of producing a molding of a styrene resin composition, which method comprises the step of subjecting to cast polymerization a liquid mixture comprising: (a) a styrene monomer in an amount of 30% by weight or more based on the total amount of the ingredients (a), (b), and (c); (b) a monofunctional monomer having one radical-polymerizable double bond in the molecule, in an amount less than 70% by weight based on the total amount of the ingredients (a), (b), and (c); (c) a polyfunctional monomer having at least two radical-polymerizable double bonds in the molecule, in an amount of from 0.01 to 40% by weight based on the total amount of the ingredients (a), (b), and (c); (d) a resin component soluble in a mixture of the ingredients (a), (b), and (c), in an amount of from 3 to 100 parts by weight per 100 parts by weight of the total amount of the ingredients (a), (b), and (c); and (e) a free-radical polymerization initiator in an amount of from 0.001 to 5 parts by weight per 100 parts by weight of the total amount of the ingredients (a), (b), (c), and (d).

14 Claims, No Drawings

STYRENE RESIN COMPOSITION AND METHOD OF PRODUCING MOLDING THEREOF

FIELD OF THE INVENTION

The present invention relates to a styrene resin composition, and more particularly, relates to a styrene resin composition having high strength and good heat formability.

BACKGROUND OF THE INVENTION

Styrene resins are very common among synthetic resins, and various kinds of copolymers for use in improving properties of styrene resins have been proposed and are being actually used extensively in various fields. Such proposals include, for example, the following: In JP-A-61-223701 (the term "JP-A" as used herein means an "unexamined published Japanese patent application") are described a copolymer of a styrene monomer and a monomer having at least two radical-polymerizable carbon-carbon double bonds in the molecule and a synthetic resin lens composed of the copolymer. In JP-A-62-187712 is described a plate of a crosslinked resin comprising styrene as the major monomer component, which plate has a specific thickness and size, is free from a depressed part on the surface, contains no bubbles inside, and has a degree of swelling of 10 or less. A method of producing this resin plate is also described therein. JP-A-56-167706 discloses a method in which a combination of special organic peroxides is used as a catalyst in order to obtain a polymer which has a low residual monomer content and a high molecular weight, is excellent in mechanical strength, especially in weight drop strength, and is suited for injection molding.

However, the resins disclosed in JP-A-61-223701 and JP-A-62-187712 are defective in that since the whole resins have a crosslinked structure so as to retain strength, they show poor heat formability.

Illustratively stated, when resin plates made of a material having poor heat formability are formed into various shapes by pressing the plates with heating against molds corresponding to the desired shapes, shape transfer from the molds cannot be attained satisfactorily and it is difficult to impart the desired shapes. Although the above problem may be suppressed by heightening the forming temperature, this causes decomposition of the resin and is apt to yield colored formed articles.

The method described in JP-A-62-187712 is disadvantageous in that it necessitates a polymerization time as long as about 8 hours and that the residual monomer content is relatively high. In addition, it is necessary that the gasket for use in this method should be subjected to a special treatment in order to avoid the development of surface defects in the plates to be produced. Styrene resins having a high residual monomer content are inferior in mechanical strength, weatherability, and solvent resistance.

The method of JP-A-56-167706 is disadvantageous in that special organic peroxides should be used and the polymer obtained is still insufficient in mechanical strength, flexural strength, etc.

SUMMARY OF THE INVENTION

An object of the present invention is to provide a styrene resin composition having good heat formability while retaining a predetermined level of strength.

Another object of the present invention is to provides a method of producing, in a short polymerization time, a styrene resin molding which is free from surface defects and has a low residual monomer content.

The present invention relates to a styrene resin composition comprising a crosslinked styrene resin and uniformly dispersed therein an uncrosslinked resin capable of being extracted with an organic solvent, the amount of the uncrosslinked resin being from 3 to 50% by weight based on the total amount of the composition.

The present invention also relates to a method of producing a molding of a styrene resin composition, which method comprises the step of subjecting to cast polymerization a liquid mixture comprising the following ingredients (a) to (e):

(a) a styrene monomer in an amount of 30% by weight or more based on the total amount of the ingredients (a), (b) and (c), (b) a monofunctional monomer having one radical-polymerizable double bond in the molecule, in an amount less than 70% by weight based on the total amount of the ingredients (a), (b) and (c), (c) a polyfunctional monomer having at least two radical-polymerizable double bonds in the molecule, in an amount of from 0.01 to 40% by weight based on the total amount of the ingredients (a), (b) and (c), (d) a resin component soluble in a mixture of the above ingredients (a), (b), and (c), in an amount of from 3 to 100 parts by weight per 100 parts by weight of the total amount of the ingredients (a), (b), and (c), and (e) a free-radical polymerization initiator in an amount of from 0,001 to 5 parts by weight per 100 parts by weight of the total amount of the ingredients (a), (b), (c), and (d).

DETAILED DESCRIPTION OF THE INVENTION

The term "crosslinked styrene resin" used herein means an organic solvent-insoluble resin obtained by polymerizing a styrene monomer with a polyfunctional monomer having two or more radical-polymerizable double bonds in the molecule and, if required, further with other monofunctional monomer having one radical-polymerizable double bond in the molecule.

Examples of the styrene monomer include styrene and derivatives thereof. Examples of the styrene derivatives include halogenated styrenes such as chlorostyrene and bromostyrene and alkyl-substituted styrenes such as vinyltoluene and α-methylstyrene. Two or more of such styrene monomers may be used in combination.

Examples of the radical-polymerizable monofunctional monomer include alkyl methacrylates such as methyl methacrylate, ethyl methacrylate, and propyl methacrylate and alkyl acrylates such as methyl acrylate, ethyl acrylate, and propyl acrylate. Preferred of these are alkyl methacrylates, especially methyl methacrylate, from the standpoints of easy availability and the transparency of the resin to be obtained. Two or more of these monomers may be used in combination.

Examples of the radical-polymerizable polyfunctional monomer include dimethacrylates or diacrylates of diols represented by formula:

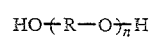

wherein R represents an alkylene group having 2 to 10 carbon atoms and n is an integer of from 1 to 10. Specific examples of such dimethacrylates or diacrylates include 1,4-butanediol dimethacrylate, neopentyl glycol dimethacrylate, 1,4-butanediol diacrylate, neopentyl glycol diacrylate, ethylene glycol dimethacrylate, diethylene glycol dimethacrylate, triethylene glycol dimethacrylate, tetraethylene glycol dimethacrylate, tetrapropylene glycol dimethacrylate, ethylene glycol diacrylate, tetraethylene glycol diacrylate, and tetrapropylene glycol diacrylate. Examples of the polyfunctional monomer further include polyfunctional aromatic compounds such as divinylbenzene, diallyl phthalate, bisphenol A dimethacrylate, and bisphenol A diacrylate, and acrylates or methacrylates of polyhydric alcohols, such as trimethylolpropane trimethacrylate, pentaerythritol tetramethacrylate, trimethylolpropane triacrylate, and pentaerythritol tetracrylate. Among the above, divinylbenzene is particularly preferably used as the polyfunctional monomer used in the present invention. The examples of the polyfunctional monomer do not include a conjugated diene compound.

In the above-described monomers, the amount of the styrene monomer is at least 30% by weight, preferably at least 40% by weight, based on the total amount of the styrene monomer, the monofunctional monomer and the polyfunctional monomer. The amount of the polyfunctional monomer is about from 0.01 to 40% by weight based on the total amount of the styrene monomer, the monofunctional monomer and the polyfunctional monomer.

The uncrosslinked resin capable of being extracted with an organic solvent may be an uncrosslinked homopolymer or copolymer of a vinyl monomer. Representative examples thereof include polystyrene, poly(methyl methacrylate), methyl methacrylate-styrene copolymers, and acrylonitrilestyrene copolymers; conjugated diene polymers are not included in the examples of the uncrosslinked resin. Preferred examples of these uncrosslinked resins include methyl methacrylate-styrene copolymers. In particular, a methyl methacrylate-styrene copolymer comprising from 40 to 90 parts by weight of styrene units and from 60 to 10 parts by weight of methyl methacrylate units is especially preferred. One or more uncrosslinked resins may be suitably selected from the above-enumerated ones according to the desired properties which the resin composition should possess. For example, in order to produce a more transparent resin composition, it is necessary to select a resin having a refractive index which is as close as possible to that of the crosslinked styrene resin, specifically so as to result in a refractive index difference between both resins of 0.01 or less.

The uncrosslinked resin is uniformly dispersed in the crosslinked styrene resin in an amount of from 3 to 50% by weight, preferably from 3 to 20% by weight, based on the total amount of the composition.

If the amount of the uncrosslinked resin is less than 3% by weight, the resin composition has impaired formability. If it is more than 50% by weight, the resin composition has insufficient strength.

The amount of the uncrosslinked resin capable of being extracted with an organic solvent means the amount of resin dissolved out by the extraction of the resin composition with an organic solvent.

As the organic solvent, any one may be used as long as it dissolves the uncrosslinked resin. Examples thereof include tetrahydrofuran, chloroform, acetone, benzene, toluene, chlorobenzene, and nitrobenzene.

The method for producing the resin composition of the present invention is not particularly limited, and include, for example, a method in which an uncrosslinked resin is dissolved in a mixture of monomers for forming a crosslinked styrene resin, and the resulting solution is subjected to bulk polymerization, in particular, the solution is polymerized and cured, e.g., in a cell or mold, thereby to obtain a resin composition having a desired shape.

In a preferred embodiment, the method of the present invention is used for producing the resin composition, the method comprising subjecting to cast polymerization a liquid mixture comprising the following ingredients (a) to (e): (a) a styrene monomer in an amount of 30% by weight or more based on the total amount of the ingredients (a), (b), and (c); (b) a monofunctional monomer having one radical-polymerizable double bond in the molecule, in an amount less than 70% by weight based on the total amount of the ingredients (a), (b), and (c); (c) a polyfunctional monomer having at least two radical-polymerizable double bonds in the molecule, in an amount of from 0.01 to 40% by weight based on the total amount of the ingredients (a), (b), and (c); (d) a resin component soluble in a mixture of the above ingredients (a), (b), and (c), in an amount of from 3 to 100 parts by weight per 100 parts by weight of the total amount of the ingredients (a), (b), and (c); and (e) a free-radical polymerization initiator in an amount of from 0.001 to 5 parts by weight per 100 parts by weight of the total amount of the ingredients (a), (b), (c), and (d).

The ingredients (a), (b), and (c) are as described hereinabove.

The resin component of the ingredient (d) is not particularly limited as long as it is soluble in the monomer component, i.e., the mixture of the ingredients (a), (b), and (c). Examples of the ingredient (d) include polystyrene, methyl methacrylate-styrene copolymers, and acrylonitrile-styrene copolymers. It is preferred that the resin component (d) be at least one member selected from the group consisting of polystyrene, poly(methyl methacrylate), a methyl methacrylate-styrene copolymer, and an acrylonitrile-styrene copolymer. In particular, a methyl methacrylate-styrene copolymer is especially preferred as the resin component (d). A methyl methacrylate-styrene copolymer comprising from 40 to 90% by weight of styrene units and from 60 to 10% by weight of methyl methacrylate units is the most preferred.

For the purpose of obtaining a more transparent styrene resin molding, it is preferable that the ingredient (d) be compatible with the resin to be obtained by the polymerization of ingredients (a), (b), and (c), or that the refractive index of the ingredient (d) be as close as possible to that of the resin to be obtained by the polymerization of the ingredients (a), (b), and (c), specifically the difference between the two refractive indexes be 0.01 or less.

The amount of the resin component (d) to be used is preferably from .3 to 100 parts by weight per 100 parts by weight of the total amount of ingredients (a), (b), and (c). If the amount of the resin component is less than 3 parts by weight, the molding to be obtained shows poor formability. If the amount thereof is more than 100 parts by weight, the solution before polymerization has too high a viscosity, making the handling thereof difficult.

As the free-radical polymerization initiator of the ingredient (e), an oil-soluble peroxide is preferably used. Examples thereof include peroxyester type initiators such as t-butyl peroxy-2-ethylhexanoate (10-hour half-life temperature, 72° C.), 1,1,3,3-tetramethylbutyl peroxy-2-ethylhexanoate (10-hour half-life temperature, 64° C.), t-butyl peroxy-3,3,5-trimethylhexanoate (10-hour half-life temperature, 100° C.), t-butyl peroxylaurate (10-hour half-life temperature, 95° C.), t-butyl peroxyisobutyrate (10-hour half-life temperature, 78° C.), t-amyl peroxy-2-ethylhexanoate (10-hour half-life temperature, 65° C.), t-butyl peroxyacetate (10-hour half-life temperature, 103° C.), di-t-butyl peroxyhexahydroterephthalate (10-hour half-life temperature, 83° C.), t-butyl peroxypivalate (10-hour half-life temperature, 56° C.), and di-t-butyl peroxyazelate (10-hour half-life temperature, 99° C.), percarbonate type initiators such as t-butyl peroxyallyl carbonate (10-hour half-life temperature, 94° C.) and t-butyl peroxyisopropyl carbonate (10-hour half-life temperature, 97° C.), and peroxyketal type initiators such as 1,1-di-t-butylperoxycyclohexane (10-hour half-life temperature, 97° C.), 1,1-di-t-butyl-peroxy-3,3,5-trimethylcyclohexane (10-hour half-life temperature, 95° C.), and 1,1-di-t-hexylperoxy-3,3,5-trimethylcyclohexane (10-hour half-life temperature, 87° C.).

In order to produce a resin composition having a reduced residual monomer content, it is preferred to employ, as the free-radical polymerization initiator, a combination of at least two initiators one of which has a 10-hour half-life temperature not higher than 75° C. and the other of which has a 10-hour half-life temperature not lower than 75° C., with the two 10-hour half-life temperatures being at least 5° C. apart. The initiator is used in an amount of from 0,001 to 5 parts by weight per 100 parts by weight of the total amount of the ingredients (a), (b), (c), and (d). In the initiator combination, the proportion of the initiator having a lower 10-hour half-life temperature to that having a higher 10-hour half-life temperature is generally from 1/0.1 to 1/1.0 by weight.

A styrene resin molding is obtained by the cast polymerization in the method for the present invention. For example, a resin as the ingredient (d) is dissolved in a monomer mixture of the ingredients (a), (b), and (c) to prepare a solution, subsequently a free-radical initiator as the ingredient (e) is mixed with the solution obtained, and the resulting mixture is injected into a mold of a desired shape and then polymerized. The mold may be made of a known material such as glass or metal and has been constructed to have the desired shape. In the case of producing a plate-form molding, examples of the mold include a glass cell comprising two glass plates facing each other with the periphery thereof being sealed with a gasket, or of a continuous steel cell comprising two endless belts made of a metal such as stainless steel which have been sealed with a gasket.

The polymerization reaction is usually conducted at a temperature between room temperature and 150° C. depending on the kind of the polymerization initiator. According to the kind of the polymerization initiator employed, the temperature conditions may be appropriately changed in two or more steps during the polymerization.

In addition to the method of the present invention described above, other methods may be used for producing the composition of the present invention. For example, there is a method in which an uncrosslinked resin is swelled in monomers for forming a crosslinked styrene resin and the monomers are then polymerized; a method in which a crosslinked styrene resin is swelled in a monomer or monomers for forming an uncrosslinked resin and the monomer(s) are then polymerized; and a method in which a styrene monomer and a radical-polymerizable monofunctional monomer are partly polymerized and, thereafter, a radical-polymerizable polyfunctional monomer is added thereto and polymerization is further conducted.

If required, a colorant, a light-diffusing agent, a reinforcement, a filler, a release agent, a stabilizer, an ultraviolet absorber, an antioxidant, an antistatic agent, a flame retardant and the like may be incorporated into the resin composition of the present invention. These additives may be previously mixed with the monomers.

The resin composition of the present invention has high strength and excellent heat formability. By the method of the present invention, a styrene resin molding which is free from surface defects and has a low residual monomer content can be obtained in a relatively short polymerization time.

This molded article can have any desired shape according to the shape of the mold. In general, however, the molding is of a plate form. The plate-form molding is suited for use in post-working in which the plate is further shaped into various parts. Examples of such parts include optical members, e.g., lenses, Fresnel lenses, and lenticular lenses, covers of lighting units or illuminants, e.g., lamp covers for automobiles, and window shields for buildings.

The present invention will be explained below in more detail with reference to the following examples and comparative examples, but the invention is not construed as being limited to the examples.

In the following examples and comparative examples, the evaluations were conducted by the following methods.

Heat Formability

It was determined in terms of the depth of indenter needle penetration which was measured at predetermined temperatures in accordance with the testing method for Vicat softening temperature as provided for in JIS K7206.

Strength

Flexural strength was measured in accordance with JIS K7203.

Uncrosslinked Resin Capable of Being Extracted with Organic Solvent (hereinafter referred to as "extractable resin") Amount A resin molding was reduced into particles of about 1 mm by 1 mm. The particles were dried at 80° C. for 12 hours, and 0.1 g of particles were weighed out thereof as a sample and placed in 100 ml of tetrahydrofuran, which was then allowed to stand at room temperature for 100 hours with occasional stirring. The undissolved matter was taken out, dried under vacuum at 80° C. for 72 hours, and then weighed. The weight loss is expressed in terms of proportion (percent by weight) to the original sample.

Residual Monomer Content

A resin molding obtained was reduced into particles and 2.5 g of the particles were subjected to extraction with 10 ml of acetone. The extract was analyzed by gas chromatography to determine the residual monomer contents, which are expressed in terms of percent by weight based on the amounts of the monomers used.

Surface Defect

The presence of depressed parts or projecting parts on the surface of the resin molding was visually examined.

EXAMPLE 1

In 100 parts by weight of a monomer mixture composed of 19.8% by weight of methyl methacrylate, 79% by weight of styrene, and 1.2% by weight of neopentyl glycol dimethacrylate were dissolved 25 parts by weight of a methyl methacrylate-styrene copolymer (weight ratio of methyl methacrylate to styrene: 20/80; viscosity-average molecular weight: 240,000; refractive index: 1.572) and 0.75 part by weight of benzoyl peroxide as a polymerization initiator. The resulting solution was injected into a polymerization cell composed of two glass plates and a poly(vinyl chloride) gasket sandwiched between the plates. Polymerization was conducted first in a water bath at 80° C. for 5 hours and then in an air bath at 100° C. for 1 hour, thereby to obtain a 3 mm-thick resin plate. The refractive index of the thus-obtained resin plate was 1.572.

The resulting resin plate had an extractable resin amount of 11.1%, a flexural strength of 900 Kgf/cm$^2$, and heat formabilities of 0.55 mm at 100° C. and 0.79 mm at 102° C.

EXAMPLE 2

A resin plate was obtained in the same manner as in Example 1 except that the methyl methacrylate-styrene copolymer (weight ratio of methyl methacrylate to styrene: 20/80) was used in an amount of 20 parts by weight and benzoyl peroxide as a polymerization initiator was used in an amount of 0.63 part by weight.

The resulting resin plate had an extractable resin amount of 9%, a flexural strength of 910 Kgf/cm$^2$, and heat formabilities of 0.5 mm at 100° C. and 0.71 mm at 102° C.

EXAMPLE 3

A resin plate was obtained in the same manner as in Example 1 except that 100 parts by weight of a monomer mixture composed of 59.3% by weight of methyl methacrylate, 39.5% by weight of styrene and 1.2% by weight of neopentyl glycol dimethacrylate, and 25 parts by weight of a methyl methacrylate-styrene copolymer (weight ratio of methyl methacrylate to styrene: 60/40; viscosity-average molecular weight: 160,000; refractive index: 1.532) were used. The resulting resin plate had an extractable resin amount of 6.4%, a flexural strength of 910 Kgf/cm$^2$, and heat formabilities of 1.02 mm at 130° C. and 1.3 mm at 140° C. The refractive index of the thus-obtained resin plate was 1.532.

COMPARATIVE EXAMPLE 1

The same procedures as in Example 1 were conducted except that the methyl methacrylate-styrene copolymer was not added. The resulting resin plate thus obtained had an extractable resin amount of 0%, a flexural strength of 840 Kgf/cm$^2$, and heat formabilities of 0.36 mm at 100° C. and 0.55 mm at 102° C.

COMPARATIVE EXAMPLE 2

The same procedures as in Example 3 were conducted except that the methyl methacrylate-styrene copolymer was not added. The resulting resin plate thus obtained had an extractable resin amount of 0%, a flexural strength of 920 Kgf/cm$^2$ and heat formabilities of 0 85 mm at 130° C. and 0.97 mm at 140° C.

EXAMPLE 4

A resin plate was obtained in the same manner as in Example 1 except that a monomer mixture composed of 19.8% by weight of methyl methacrylate, 79% by weight of styrene, and 1.2% by weight of 2,2-bis(4-acryloyloxydiethoxyphenyl)propane was used. The resulting resin plate had an extractable resin amount of 10 9%, a flexural strength of 750 Kgf/cm$^2$, and heat formabilities of 1.40 mm at 112° C. and 1.7 mm at 118° C.

EXAMPLE 5

A resin plate was obtained in the same manner as in Example 1 except that a monomer mixture composed of 19.8% by weight of methyl methacrylate, 79% by weight of styrene, and 1.2% by weight of divinylbenzene was used. The resulting resin plate had an extractable resin amount of 3.6%, a flexural strength of 830 Kgf/cm$^2$, and heat formabilities of 1.10 mm at 114° C. and 1.3 mm at 124° C.

COMPARATIVE EXAMPLE 3

The same procedures as in Example 4 were conducted except that the methyl methacrylate-styrene copolymer was not added. The resulting resin plate had an extractable resin amount of 0%, a flexural strength of 740 Kgf/cm$^2$, and heat formabilities of 1.23 mm at 112° C. and 1.43 mm at 118° C.

COMPARATIVE EXAMPLE 4

The same procedures as in Example 5 were conducted except that the methyl methacrylate-styrene copolymer was not added. The resulting resin plate had an extractable resin amount of 0%, a flexural strength of 820 Kgf/cm$^2$, and heat formabilities of 0.91 mm at 114° C. and 1.0 mm at 124° C.

EXAMPLE 6

19.8 Parts by weight of methyl methacrylate (hereinafter referred to as "MMA") was mixed with 79 parts by weight of styrene and 1.2 parts by weight of neopentyl glycol dimethacrylate (hereinafter referred to as "NPG"). In this mixture was dissolved 25 parts by weight of a methyl methacrylate-styrene copolymer (weight ratio of methyl methacrylate to styrene: 20/80). In 100 parts by weight of the thus-obtained solution were dissolved 0.4 part by weight of t-butyl peroxy-2-ethylhexanoate and 0.15 part by weight of t-butyl peroxyisopropyl carbonate. The resulting solution was injected into a polymerization cell composed of two glass plates and a poly(vinyl chloride) gasket sandwiched between the plates. Polymerization was conducted in an air bath first at 85° C. for 5 hours and then at 100° C. for 1 hour, thereby to obtain a 3 mm-thick resin plate.

The resin plate obtained had a good appearance with no surface defects. The residual monomer contents in this resin plate were 0.40% for styrene and 0.10% for MMA. The resin plate had an extractable resin amount of 11.6%.

EXAMPLE 7

The same procedures as in Example 6 were conducted except that 0.75 part by weight of lauryl peroxide was used as a free-radical polymerization initiator and that the air bath temperature was regulated at 85° C. for 10 hours and at 100° C. for 1 hour. The resulting resin plate had a good appearance with no surface defect, and its residual monomer contents were 2.40% for styrene and 0.10% for methyl methacrylate. The resulting plate had an extractable resin amount of 12.3%.

EXAMPLES 8 AND 9

Resin plates were obtained in the same manner as in Example 6 except that the monomer mixtures and resin components as shown in Table 1 were used. The evaluation results obtained are summarized in Table 1 along with the results in Example 6.

TABLE 1

|  | Example | | | |
|---|---|---|---|---|
|  | 6 | 7 | 8 | 9 |
| Monomers | | | | |
| MMA | 19.8 | 19.8 | 29.6 | 59.3 |
| Styrene | 79.0 | 79.0 | 69.2 | 39.5 |
| NPG | 1.2 | 1.2 | 1.2 | 1.2 |
| Resins | | | | |
| MMA | 20 | 20 | 30 | 60 |
| Styrene | 80 | 80 | 70 | 40 |
| Refractive index | 1.572 | 1.572 | 1.562 | 1.532 |
| Viscosity-average molecular weight | 240,000 | 240,000 | 250,000 | 160,000 |
| Residual monomers | | | | |
| MMA | 0.1 | 0.1 | 0.2 | 0.01 |
| Styrene | 0.4 | 2.4 | 0.5 | 0.6 |
| Surface defect | none | none | none | none |
| Extractable resin amount (%) | 11.6 | 12.3 | 9.7 | 8.1 |
| Refractive index | 1.572 | 1.572 | 1.562 | 1.532 |

EXAMPLE 10

A resin plate was obtained in the same manner as in Example 6 except that 1.2 parts by weight of divinylbenzene was used in place of 1.2 parts by weight of NPG. The resin plate obtained had a good appearance with no surface defects. The residual monomer contents in this resin plate were 0.22% for styrene and 0.07% for MMA. The resin plate had an extractable resin amount of 5.2%.

EXAMPLE 11

A resin plate was obtained in the same manner as in Example 6 except that 1.2 parts by weight of 2,2-bis(4-acryloyloxydiethoxyphenyl)propane was used in place 1.2 parts by weight of NPG. The resin plate obtained had a good appearance with no surface defects. The residual monomer contents in this resin plate were 0.20% for styrene and 0.06% for MMA. The resin plate had an extractable resin amount of 11.0%.

EXAMPLE 12

A resin plate was obtained in the same manner as in Example 6 except that the monomer amounts were changed to 19.99 parts by weight for MMA, 79.96 parts by weight for styrene, and 0.05 part by weight for NPG. The resin plate obtained had a good appearance with no surface defects. The residual monomer contents in this resin plate were: styrene, 0.26% for styrene and 0.06% for MMA. The resin plate had an extractable monomer amount of 18.3%.

EXAMPLES 13 TO 16

Resin plates were obtained in the same manner as in Example 6 except that the initiators as shown in Table 2 were used in place of 0.4 part by weight of t-butyl peroxy-2-ethylhexanoate and 0.15 part by weight of t-butyl peroxyisopropyl carbonate. The evaluation results obtained are summarized in Table 2.

TABLE 2

| Example | Radical polymerization initiator (parts by weight) | Residual monomer MMA (%) | Residual monomer Styrene (%) | Surface defect | Extracted resin amount (%) |
|---|---|---|---|---|---|
| 13 | 1,1,3,3-tetrabutyl peroxy-2-ethylhexanoate (0.50) t-butyl peroxyosopropyl carbonate (0.15) | 0.10 | 0.02 | none | 10.6 |
| 14 | t-butyl peroxy-2-ethyl-hexanoate (0.4) t-butyl peroxyisobutyrate (0.15) | 0.03 | 0.60 | none | 11.7 |
| 15 | t-butyl peroxy-2-ethyl-hexanoate (0.4) 1,1-di-t-hexylperoxy-3,3,5-trimethylcyclohexane (0.15) | 0.10 | 0.50 | none | 9.8 |
| 16 | t-butyl peroxy-2-ethyl-hexanoate (0.4) t-butyl peroxyacetate (0.15) | 0.10 | 0.90 | none | 12.3 |

COMPARATIVE EXAMPLE 5

The same procedures as in Example 6 were conducted except that the addition of a resin component was omitted. The residual monomer contents in the resin plate thus obtained were 0.50% for styrene and 0.10% for MMA. However, this resin plate had depressed defects on the surface thereof.

While the invention has been described in detail and with reference to specific embodiments thereof, it will be apparent to one skilled in the art that various changes and modifications can be made therein without departing from the spirit and scope thereof.

What is claimed is:

1. A styrene resin composition comprising a crosslinked styrene resin and uniformly dispersed therein an uncrosslinked resin capable of being extracted with an organic solvent, the amount of said uncrosslinked resin being from 3 to 20% by weight based on the total amount of the composition, wherein said styrene resin composition is produced by a method comprising the steps of:
   dissolving an uncrosslinked resin in a mixture of monomers to form a crosslinked styrene resin, and then
   bulk polymerizing the resulting solution.

2. A composition as claimed in claim 1, wherein said uncrosslinked resin is at least one member selected from the group consisting of polystyrene, poly(methyl methacrylate), a methyl methacrylate-styrene copolymer, and an acrylonitrile-styrene copolymer.

3. A composition as claimed in claim 2, wherein said uncrosslinked resin is a methyl methacrylate-styrene copolymer.

4. A composition as claimed in claim 3, wherein said methyl methacrylate-styrene copolymer comprises from 40 to 90 parts by weight of styrene units and from 60 to 10 parts by weight of methyl methacrylate units.

5. A composition as claimed in claim 1, wherein the difference in refractive index between said crosslinked styrene resin and said uncrosslinked resin capable of being extracted with an organic solvent is 0.01 or less.

6. A method of producing a molding of a styrene resin composition, which method comprises the step of subjecting to cast polymerization a liquid mixture comprising:
(a) a styrene monomer in an amount of 30% by weight or more based on the total amount of the ingredients (a), (b), and (c),
(b) a monofunctional monomer having one radical-polymerizable double bond in the molecule, in an amount less than 70% by weight based on the total amount of the ingredients (a), (b), and (c),
(c) a polyfunctional monomer having at least two radical-polymerizable double bonds in the molecule, in an amount of from 0.01 to 40% by weight based on the total amount of the ingredients (a), (b), and (c),
(d) a resin component soluble in a mixture of the ingredients (a), (b), and (c), in an amount of from 3 to 100 parts by weight per 100 parts by weight of the total amount of the ingredients (a), (b), and (c), and
(e) at least two free-radical polymerization initiators, one of which has a 10-hour half-life temperature not higher than 75° C. and the other of which has a 10-hour half-life temperature not lower than 75° C. said two 10-hour half-life temperatures being at least 5° C. apart, in an amount of from 0.001 to 5 parts by weight per 100 parts by weight of the total amount of the ingredients (a), (b), (c), and (d).

7. A method as claimed in claim 6, wherein said monofunctional monomer (b) is an alkyl methacrylate.

8. A method as claimed in claim 7, wherein said alkyl methacrylate is methyl methacrylate.

9. A method as claimed in claim 6, wherein said polyfunctional monomer (c) is the dimethacrylate or diacrylate of a diol represented by formula:

wherein R represents an alkyl group having 2 to 10 carbon atoms and n is an integer of 1 to 10.

10. A method as claimed in claim 6, wherein said polyfunctional monomer (c) is divinylbenzene.

11. A method as claimed in claim 6, wherein said resin component (d) is at least one member selected from the group consisting of polystyrene, poly(methyl methacrylate), a methyl methacrylate-styrene copolymer, and an acrylonitrile-styrene copolymer.

12. A method as claimed in claim 11, wherein said resin component (d) is a methyl methacrylate-styrene copolymer.

13. A method as claimed in claim 12, wherein said methyl methacrylate-styrene copolymer comprises from 40 to 90% by weight of styrene units and from 60 to 10% by weight of methyl methacrylate units.

14. A method as claimed in claim 6, wherein said free-radical initiator (e) is an oil-soluble peroxide.

* * * * *